United States Patent [19]

Takemoto et al.

[11] 4,281,753
[45] Aug. 4, 1981

[54] VIBRATION DAMPING DEVICE FOR A MECHANICAL CLUTCH RELEASE SYSTEM FOR A MOTOR VEHICLE

[75] Inventors: Kazuhiko Takemoto, Toyota; Toshiyuki Ninomiya, Kariya; Shigemichi Yamada, Hoi; Minoru Yukiyasu, Toyota, all of Japan

[73] Assignee: Toyota Jidosha Kogyo Kabushiki Kaisha, Toyota, Japan

[21] Appl. No.: 57,074

[22] Filed: Jul. 12, 1979

[30] Foreign Application Priority Data

Mar. 22, 1979 [JP] Japan ............................... 54-37016[U]

[51] Int. Cl.³ .............................................. F16D 19/00
[52] U.S. Cl. ................................. 192/99 S; 192/30 V
[58] Field of Search ................. 192/99 S, 99 R, 99 A, 192/99 B, 30 V; 74/490, 512; 64/1 V

[56] References Cited
U.S. PATENT DOCUMENTS 3,800,929 4/1974 Morris ................................ 192/99 S

FOREIGN PATENT DOCUMENTS 2658019 7/1978 Fed. Rep. of Germany ............. 74/490
51-35862 9/1976 Japan ..................................... 192/30 V
52-8899 2/1977 Japan ..................................... 192/99 S Primary Examiner—George H. Krizmanich
Attorney, Agent, or Firm—Oblon, Fisher, Spivak, McClelland & Maier

[57] ABSTRACT

Disclosed herein is a vibration damping device for a mechanical clutch release system for a motor vehicle having a clutch cable comprising an outer cable mounted to the body of the motor vehicle and to the engine at one end and at the other end which is positioned forwardly of an exhaust pipe respectively and an inner cable mounted to a clutch pedal and to a clutch release fork at one end outwardly extending from the one end of the outer cable and at the other end outwardly extending from the other end of the outer cable respectively. The vibration damping device comprises a cylindrical body which is enclosingly secured to the inner cable between the other end of the outer cable and the clutch release fork to increase flexural rigidity of the inner cable.

6 Claims, 7 Drawing Figures

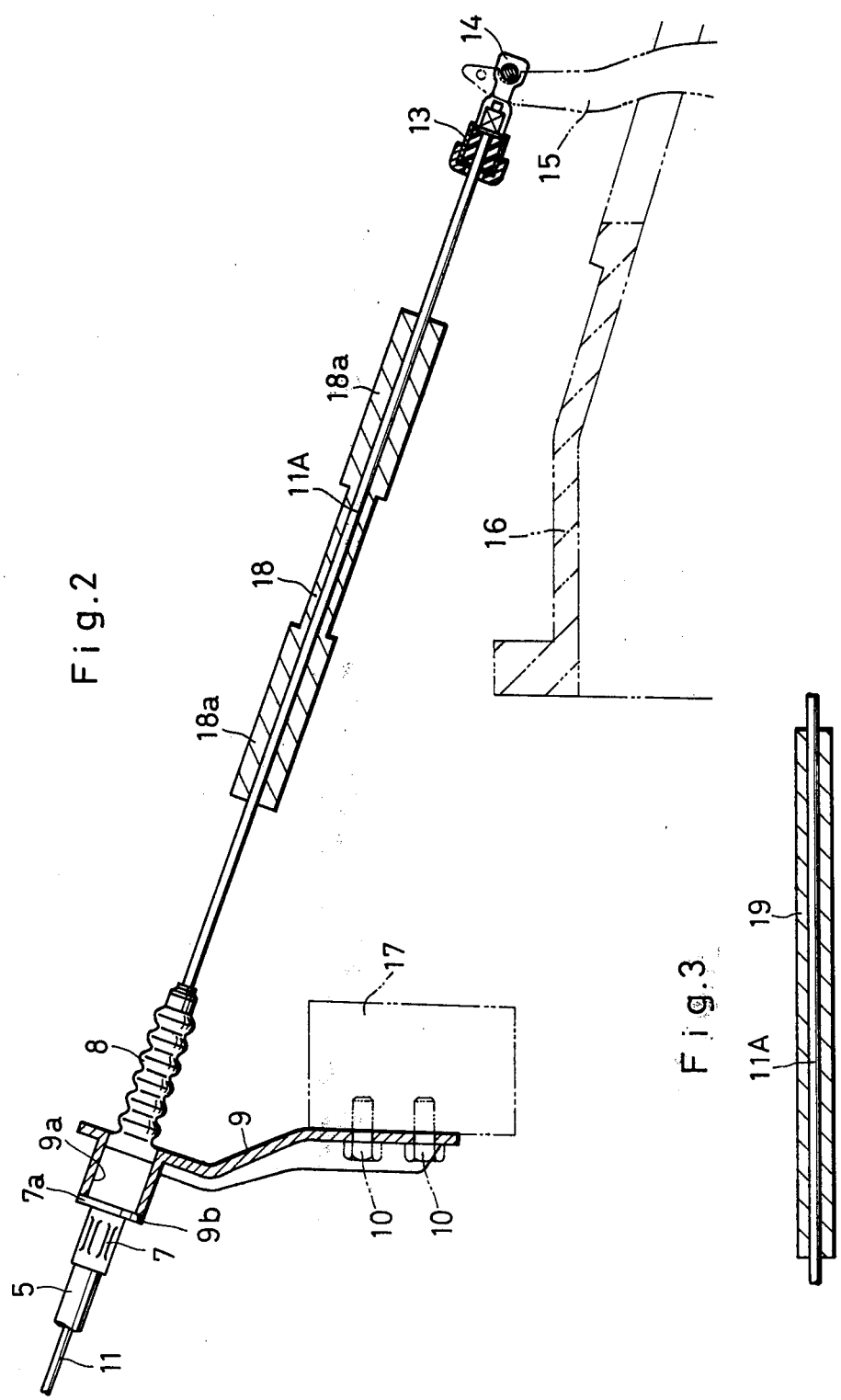

VIBRATION DAMPING DEVICE FOR A MECHANICAL CLUTCH RELEASE SYSTEM FOR A MOTOR VEHICLE

BACKGROUND OF THE INVENTION

1. Field of the Invention

The present invention relates to a mechanical clutch release system for a motor vehicle, and more particularly, to a vibration damping device which prevents transmission of vibration from the engine and the clutch to a clutch pedal through a clutch cable.

2. Description of the Prior Art

In a conventional clutch release system for a motor vehicle, an outer cable is mounted to a dash panel at one end and to the flange of a clutch housing at the other end, and is arcuately curved between both ends to project forwardly. An inner cable extending longitudinally through the outer cable projects outwardly from both ends of the outer cable to be connected to the clutch pedal at one end and to a clutch release fork at the other end. Since the aforementioned other ends of the outer and inner cables are both immovable with respect to the clutch housing, there is no relative displacement between these ends of the outer and inner cables when the clutch is not worked. However, in an engine of counter-flow type, the intake and exhaust pipes are both on one side of the engine, and it is difficult to mount said other end of the outer cable to the clutch housing since the space in the engine room is narrowed and the outer cable tends to be damaged by the high temperature of the exhaust pipe. An attempt has been made to overcome this disadvantage by supporting said other end of the outer cable by a bracket secured to a member of the engine and having only the inner cable exposed to the high temperature of the exhaust pipe. As the result, however, the space between the bracket and the clutch release fork, in which only the inner cable is placed, is necessarily lengthened. When vibration is transmitted from the engine and the clutch to the inner cable exposed in the lengthened space, the inner cable is made to vibrate with complicated mode and large amplitude. The vibration of the inner cable is then transmitted to the clutch pedal to cause noise in the vehicle.

SUMMARY OF THE INVENTION

Accordingly, it is the object of the present invention to provide a device for a mechanical clutch release system which can satisfactorily damp vibration of the inner cable exposed between the bracket and the clutch release fork to reduce noise in the vehicle caused by transmission of the vibration through the clutch cable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an enlarged partially fragmentary plan view of FIG. 1;

FIG. 3 is a cross sectional view of another embodiment of the present invention;

DETAILED DESCRIPTION OF THE PREFERRED EMBODIMENTS

Figure 1:
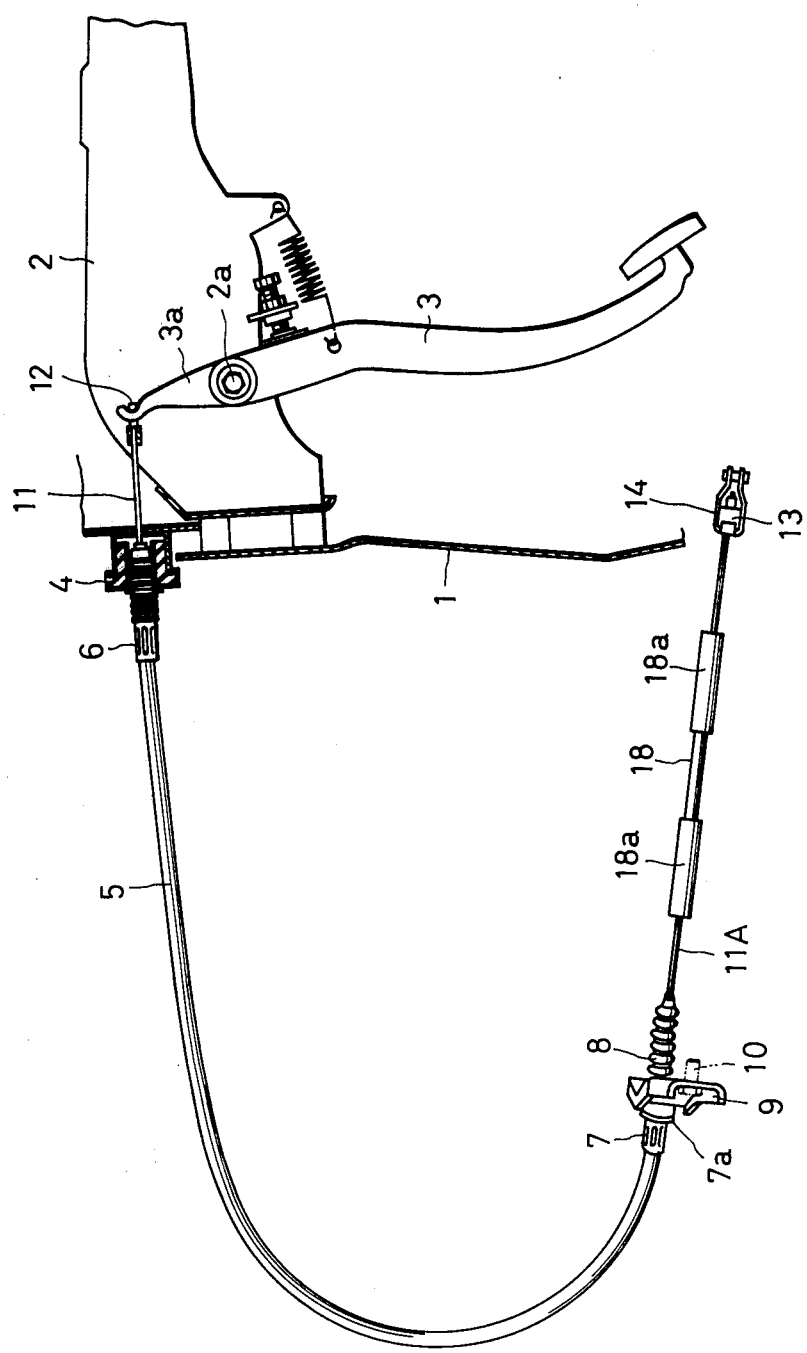
FIG. 1 is a side elevational view of a mechanical clutch release system to which an embodiment of the device according to the present invention is applied.

Referring now to FIG. 1 of the drawings in which a mechanical clutch release system for a motor vehicle is shown, numeral 1 indicates a dash panel to which a pedal bracket 2 is mounted to movably support a clutch pedal 3 through a shaft 2a.

Movement of the clutch pedal 3 is transmitted to a clutch release fork 15 through an outer cable 5 and an inner cable 11 extending longitudinally through the outer cable 5 to move along the axis thereof, as is well known in the art. A pair of cable caps 6 and 7 of, for example, metal are secured to the both ends of the outer cable 5. The cable cap 6 which is near the clutch pedal 3 is mounted to the dash panel 1 through an impact absorbing member 4 of elastic material such as rubber. The other cable cap 7 is supported to communicate with a cylindrical through-hole 9a of a bracket 9 which is secured by a plurality of bolts 10 to a fixed metal fitting (not shown) of an engine mounting 17 (see FIG. 2). Namely, location of the cable cap 7 is effected by its flange 7a which contacts the end surface of the through-hole 9a of the bracket 9. The fixed metal fitting of the engine mounting 17 may have a projection to substitute for the bracket 9.

A hook 12 is secured to the end of the inner cable 11 extending outwardly from the end of the cable cap 6 near the dash panel 1. The hook 12 is engaged with a clutch lever 3a which is integral with the clutch pedal 3 to connect the inner cable 11 with the clutch lever 3a (see FIG. 1). A dust boot 8 is connected to the cable cap 7 near the bracket 9, and a clevis 14 is mounted through an impact absorbing member 13 of elastic material such as rubber to the end of the inner cable 11A extending outwardly from the dust boot 8 (see FIG. 2). The clevis 14 is engaged with a clutch release fork 15 projecting from a clutch housing 16 to connect the inner cable 11A with the clutch release fork 15.

Although the cable cap 7 is generally supported by a part of the clutch housing 16 in a conventional system, the bracket 9 is utilized to support the cable cap 7 in the system shown in FIGS. 1 and 2 to make good use of the space of the engine room and to protect the outer cable 5 from the high temperature of an exhaust pipe (not shown) of the engine. Namely, only the inner cable 11A is exposed between the cable cap 7 supported by the bracket 9 and the clevis 14 engaged with the clutch release fork 15 to protect the outer cable 5 from the high temperature of the exhaust pipe. The inner cable 11A exposed between the cable cap 7 and the clevis 14 is necessarily lengthened.

Figure 4:
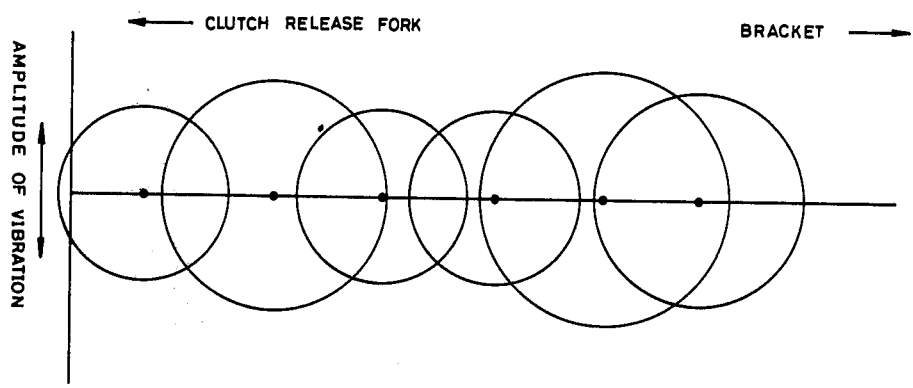
FIG. 4 is a graph showing vibration mode of a conventional inner cable.

FIG. 4 is a graph showing a typical example of the vibration mode of a conventional inner cable exposed between the cable cap and the clevis, which is measured when vibration is transmitted from the engine and the clutch to the inner cable while the vehicle is driven. It is seen from FIG. 4 that in a conventional system the amplitude of vibration of the inner cable becomes large when the vehicle is driven. In FIG. 4, the left-hand side shows the clutch release fork side and the right-hand side shows the bracket side.

Figure 5:
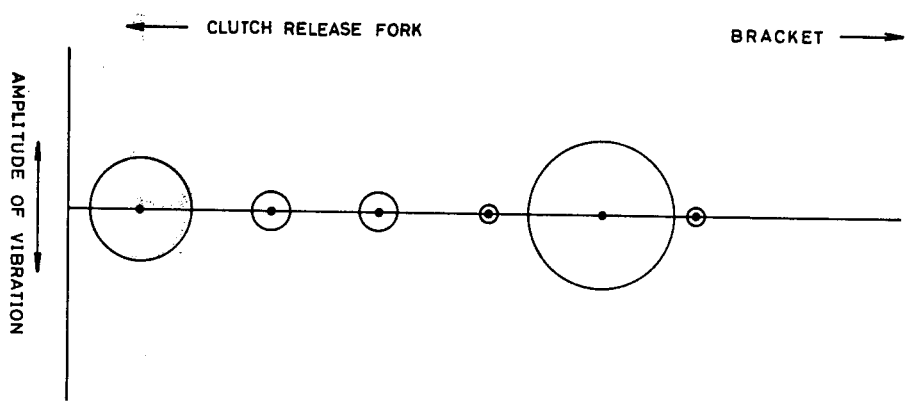
FIG. 5 is a graph showing vibration mode of an inner cable to which the device of the present invention is applied.

Referring again to FIGS. 1 and 2 of the drawings, there is shown a cylindrical damper 18 embodying the device according to the present invention. The damper 18 has high flexural rigidity, and is secured to the inner cable 11A between the cable cap 7 and the clevis 14 to integrally enclose the inner cable 11A and thereby increase flexural rigidity thereof. Further, the damper 18 has a pair of large portions 18a having large amounts of mass or moments of inertia to accommodate i.e. dampen the inner cable 11A at the portions showing especially large amplitude of vibration in the graph of FIG. 4. FIG. 5 is a graph showing the vibration mode of the inner cable 11A to which the damper 18 is secured. It is seen from FIG. 5 that the amplitude of vibration of the inner cable 11A is remarkably decreased by virtue of the damper 18.

The present inventors conducted the following tests to examine the vibration damping capacity of the damper 18 and the influence exerted by it upon the noise in the vehicle.

First, an accelerometer was mounted to the clutch release fork 15 to study the relation between the acceleration of vibration of the clutch release fork 15 and the engine speed with respect to the system utilizing the conventional inner cable and with respect to the system utilizing the inner cable 11A to which the damper 18 of the present invention was secured respectively. The amount of the mass of the damper 18 was 105.5 g. The vehicle utilized in the test was put into third gear and then accelerated.

Figure 6:
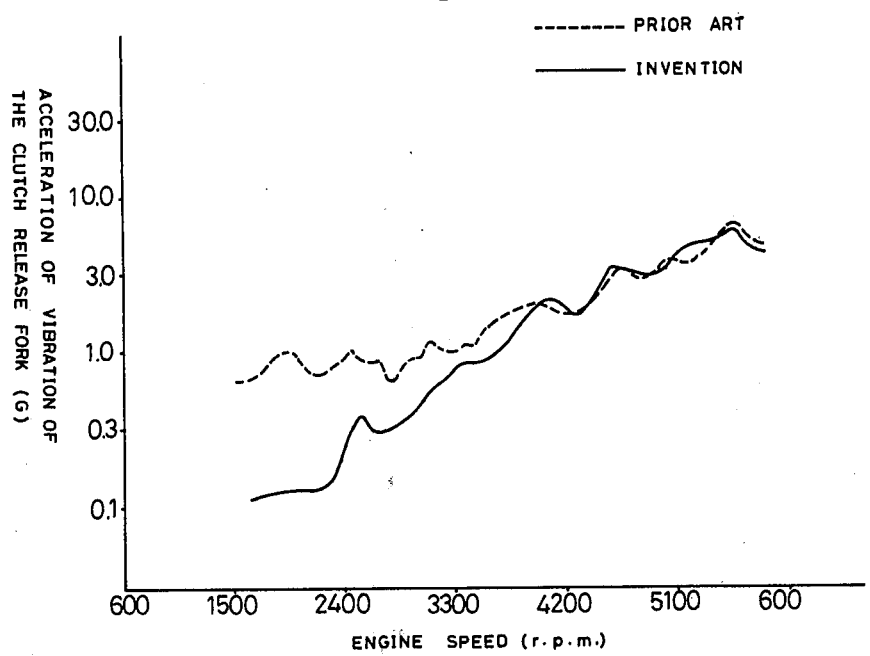
FIG. 6 is a graph showing the relation between acceleration of vibration of the clutch release fork and engine speed.

FIG. 6 is a graph showing the results of the aforementioned test. The ordinate of this graph represents the acceleration of vibration of the clutch release fork 15 and the abscissa represents the engine speed. In the graph of FIG. 6, further, the broken line represents the result in the conventional system and the full line represents the result in the system utilizing the damper 18 of the present invention. It is seen from FIG. 6 that the acceleration of vibration of the clutch release fork 15 is remarkably reduced by the damper 18 in the engine speed range of 1000 r.p.m. through 3000 r.p.m.

Figure 7:
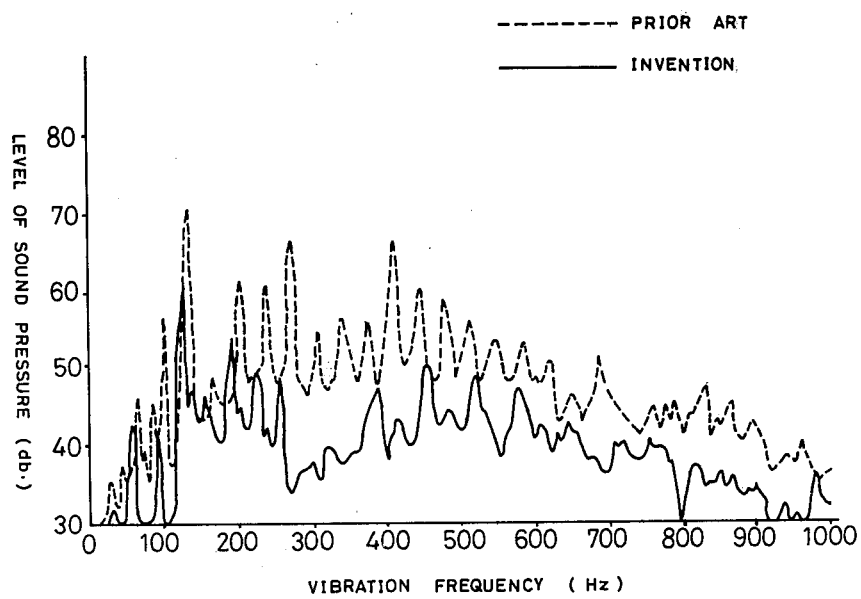
FIG. 7 is a graph showing the relation between sound pressure in the vehicle and vibration frequency of the dash panel.

Then, sound pressure was measured in the driver's seat under the same condition with the aforementioned test to make frequency analysis of a high-speed Fourier converter. FIG. 7 is a graph showing the results of the frequency analysis, in which the ordinate represents the level of sound pressure in decibel and the abscissa represents vibration frequency of the dash panel 1 in hertz. In this graph, the broken line represents the result in the conventional system and the full line represents the result in the system utilizing the damper 18 of the present invention. It is seen from FIG. 7 that the level of sound pressure is lowered by utilization of the damper 18 in all range of the vibration frequency of the dash panel 1.

The damper 18 may previously be mounted to the inner cable 11A by casting to save the space therefor and to increase flexural rigidity of the inner cable 11A. In this case, the inner cable 11A should pass through the through-hole 9a of the bracket 9 with the damper 18 being mounted thereto. Consequently, the outer diameter of the large portions 18a of the damper 18 is set to be smaller than the inner diameter of the through-hole 9a.

The damper 18 may also be mounted to the inner cable 11A by swaging. In this case, swaging of the damper 18 to the inner cable 11A is effected after the inner cable 11A passes through the through-hole 9a, whereby the outer diameter of the damper 18 need not be smaller than the inner diameter of the through-hole 9a.

As hereinabove described, the function of the large portions 18a of the damper 18 is to accommodate mass distribution thereof to the vibration mode of the inner cable 11A, thus maximizing flexural rigidity at maximum vibration mode locations. Therefore, a damper 19 of smooth cylindrical construction as shown in FIG. 3 may be utilized when it is made of partly different materials to accommodate its mass distribution and flexural rigidity to the vibration mode of the inner cable 11A. The smooth cylindrical damper 19 may also be utilized depending on the degree of vibration damping capacity required.

Thus, since the damper according to the present invention increases flexural rigidity of the inner cable exposed between the cable cap near the bracket and the clevis engaged with the clutch release fork while damping vibration thereof by mass effect or flexural rigidity, the noise in the vehicle concomitant with the vibration of the inner cable can effectively be reduced.

While the invention has been described with reference to a preferred embodiment thereof, it is to be understood that modifications or variations may be easily made without departing from the scope of this invention which is defined by the appended claims.

What is claimed is:

1. Apparatus for damping vibrations in a motor vehicle having a body, an engine, an exhaust pipe, a clutch pedal, and a clutch release fork comprising:
    an outer clutch cable mounted at one end to the body of said motor vehicle, and mounted at the other end to the engine, forward of the exhaust pipe;
    an inner clutch cable, partially enclosed within said outer cable, mounted at one end to said clutch pedal and mounted at the other end to said clutch release fork, and having an exposed portion extending from said clutch release fork to said other end of said outer cable;
    a vibration damping device comprising a cylindrical damper of high flexural rigidity, enclosing at least a portion of, and being secured to, said exposed portion of said inner cable.

2. The invention as defined in claims 1 or 6, wherein the ends of said damper are larger in outer diameter than the center thereof.

3. The invention as defined in claims 1 or 6, wherein said damper has a uniform outer diameter.

4. The invention as defined in claim 3 wherein end portions of said damper are made of material of greater mass than that of the center thereof.

5. The invention as defined in claim 3, wherein end portions of said damper are made of material of greater flexural rigidity than that of the center thereof.

6. The invention as defined in claim 1, further comprising a support bracket connected to said engine for supporting said other end of said outer cable so as to facilitate sliding movement of said inner cable within said outer cable.

* * * * *